Nov. 6, 1956 W. E. BURNS 2,769,773
METHYLETHYLPYRIDINE-METHYLVINYLPYRIDINE FRACTIONATION
Filed Aug. 21, 1953
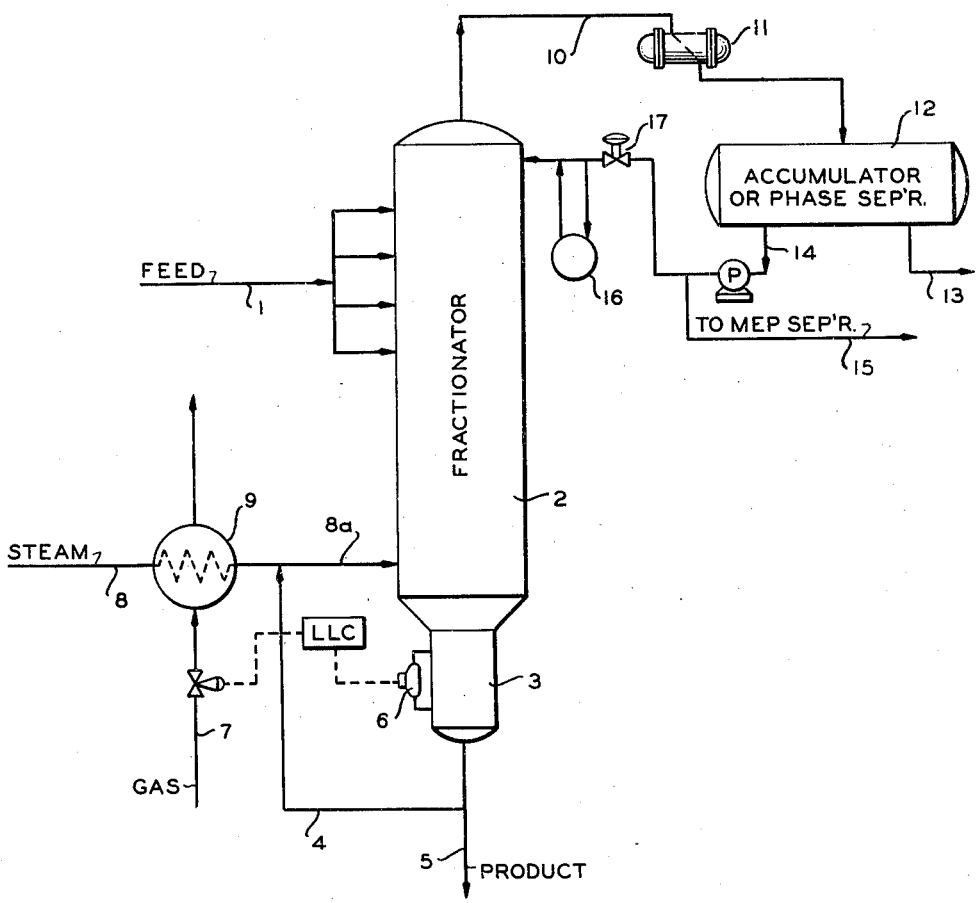
*INVENTOR.*
W. E. BURNS
BY Hudson & Young
ATTORNEYS

United States Patent Office 2,769,773
Patented Nov. 6, 1956

2,769,773

METHYLETHYLPYRIDINE-METHYLVINYL-PYRIDINE FRACTIONATION

William E. Burns, Pasadena, Tex., assignor to Phillips Petroleum Company, a corporation of Delaware Application August 21, 1953, Serial No. 375,633

17 Claims. (Cl. 202—46)

This invention is directed to an improved process for the fractional separation of a mixture of volatile compounds and, in particular, to the fractional separation of a mixture comprising one or more polymerizable organic compounds.

The invention is further directed to an improved process for the separation of methylethylpyridine from methylvinylpyridine by fractionation. More specifically, it relates to a process wherein methylethylpyridine is fractionated from methylvinylpyridine at a very low temperature and under such conditions that very little polymerization occurs.

One of the most recent developments in the field of nitrogen-petroleum chemicals is the production of synthetic pyridines on a commercial scale. One of the most important synthetic pyridines, from the standpoint of quantity produced, is 2-methyl-5-ethyl pyridine (MEP). It is manufactured from petroleum-derived acetaldehyde and ammonia. In the first step, acetaldehyde is polymerized to paraldehyde in the presence of a sulphuric acid catalyst according to the following reaction:

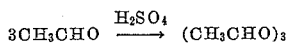

Makeup acetaldehyde and sulphuric acid are fed continuously into the polymerization reactor. The acid catalyst is neutralized and the paraldehyde is purified by fractionation prior to the MEP synthesis step.

In the second step, the paraldehyde is reacted with ammonia to form 2-methyl-5-ethyl pyridine (MEP) according to this reaction:

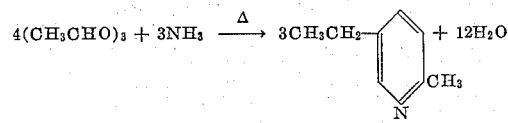

The condensation of the paraldehyde with aqueous ammonia is carried out at 450° to 550° F. and under sufficient pressure to maintain the reactants and products essentially in the liquid phase. Catalysts, which may be used alone or with a promoter, include ammonium acetate, ammonium chloride, ammonium bifluoride, boron trifluoride, and certain other fluorine-containing substances. In addition to MEP, some 2- and 4-picolines and higher boiling pyridines are produced. The chief uses for MEP are as intermediates in the manufacture of vinyl pyridines and nicotinic acid.

Two-methyl-5-vinyl pyridine (MVP) is produced by catalytic dehydrogenation of MEP according to the following reaction:

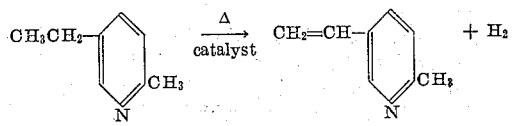

In addition to the main product, MVP, a certain amount of pyridine, as such, 2-picoline, 3-picoline, 3-ethyl pyridine, lutidine (2,5-dimethyl pyridine), and 3-vinyl pyridine by-products are produced.

As catalyst, we prefer to employ compositions comprising a minor proportion of an oxide of a metal from the left-hand column of Group 6 of the Periodic Table, that is, chromium, molybdenum, tungsten, or uranium, supported on a major proportion of a relatively inert material. It is preferred that the support or carrier be one which, in conjunction with the metal oxide referred to above, gives the catalyst a high activity. The preferred carrier is gamma alumina in suitably extended form. Other carriers which may less profitably be employed are alpha alumina, beta alumina, magnesia, silica gel, alumina gel, silica-alumina mixtures, zirconia, bauxite, etc.

The vinylpyridines are useful intermediates in the preparation of fibers, adhesives, ion exchange resins, and synthetic rubber.

The next step is the fractionation of the effluent from the dehydrogenation step. In this connection, difficulties are often encountered because of the tendency of these vinyl compounds to polymerize on standing or at elevated temperatures. In the case of vinylpyridines, the presence of polymer is particularly undesirable because vinylpyridine compounds are used as monomers for use in polymerization reactions and the like. To check polymerization during the fractional distillation step, it is necessary to keep the amount of liquid in the fractionator to a prescribed minimum, keeping it in gaseous form as far as possible. The less the percentage by weight of liquid pyridine to gaseous pyridine in the fractionator, the less will be the polymerization because, in the gaseous state, the molecules are further apart than in the liquid state. Thus the chances for contact between individual molecules, with subsequent condensation, are proportionately less with the molecules in a gaseous state.

The principal object of the present invention is to effect fractionation of a mixture of compounds with careful control over the equilibrium. A further object is to effect fractionation of a mixture comprising one or more organic compounds with a minimum of polymerization. A more specific object is the fractionation of the effluent from a dehydrogenation reactor wherein MEP is dehydrogenated to MVP. Another object is to provide a process of the foregoing type wherein the liquid level in the fractionator is kept at a minimum by means of a level controller.

The accompanying drawing is a diagrammatic illustration of an arrangement of apparatus suitable for conducting the present invention. However, the claimed invention is not limited to the illustrations, these being indicative of but a few of the various ways in which the present invention may be employed.

Referring to the drawings, the figure illustrates a fractionation column in which the bottoms product is volume controlled.

Referring to the figure, feed, comprising the effluent from an MEP dehydrogenator, is pumped through line 1 to fractionating column 2. The latter may be of any conventional type capable of providing countercurrent contact of liquid and vapors with reflux. Typical dimensions for this member would be 9′ I. D. x 150′. A vertical conduit 3, about 1′ in diameter and 4′ in length, is attached to the base of the fractionating column 2 to contain the bottoms, or product, liquid. The liquid level in the fractionating column is maintained in this conduit. Bottoms liquid is withdrawn from the base of conduit 3 through line 4, a portion passes to line 5 for further treatment; the remainder is recirculated via lines 4 and 8a to the base of fractionator 2. Superheated steam is added to the recycled bottoms liquid to supply heat to the fractionator. The addition of the recycled bottoms liquid to the superheated steam and the subsequent injection of the mixture into the fractionator must be so arranged as to bring the temperature of the recycled bottoms to the maximum temperature of the system as nearly instantaneously as possible since polymerization of MVP accelerates as its temperature rises. Superheated steam enters fractionating column 2 near the bottom through line 8a, along with recycled bottoms. The degree of superheat of this steam is regulated by a level controller 6 attached to conduit 3 in open communication therewith. Steam from line 8 at 30 pounds per square inch gage is superheated from 224° F. to 440° F. in superheater 9, utilizing about 1300 S. C. F. of fuel gas per hour. Liquid level controller 6 regulates the flow of gaseous fuel into the steam superheater 9. Steam enters superheater 9 at a constant rate through line 8; thus the rate of steam injection into the fractionating column is also substantially constant. Its temperature, only, is varied in accordance with fluctuations in the level of the bottoms liquid in conduit 3, which, by means of the level controller 6, adjusts the gas feed through line 7.

Overhead vapors flow through line 10, are condensed in condenser 11, and separated into an aqueous and organic phase in accumulator 12. The organic layer is withdrawn through line 14 and divided into two streams, one portion being withdrawn through 15 for MEP recovery, the other recycled to fractionator 2 as reflux. The division of the two streams is controlled by flow regulator 17. Sulfur is added to the reflux stream at 16 as a polymerization inhibitor.

The function of the liquid level controller is to insure that the fluctuations in the level of bottoms liquid in conduit 3 are gradual, and minor in magnitude. A sudden rise or fall of the liquid level may upset the equilibrium in the system; as much as a day's time would then be consumed in re-establishing equilibrium. Even if the level falls gradually, if it falls too far it means that too much heat is being added to the fractionation column and that too much organic material is going overhead. If the conduit 3 goes dry, the pump in recycle line 4 will begin drawing vapors, thus disrupting the normal operation of the recycle. If the liquid level rises too high, excessive polymerization results, the rate of polymerization being proportional, in part, to the volume of liquid.

In the operation of the process characterizing the invention, a mixture of predominantly MEP and MVP comprising the effluent from an MEP dehydrogenator is passed through line 1 to fractionating column 2. This feed contains approximately three times as much MEP as MVP by weight, with minor amounts of water, picoline, dimethylpyridine, and vinylpyridine. Upon discharge into the column, vapors disengaging proceed up through the trays and unvaporized residue works down countercurrently to the superheated steam injected through 8a, the ultimate residuum collecting in conduit 3. The rate of water injection, in the form of steam, through 8 is approximately ten times the rate of feed through line 1. The pressure in the top of fractionating column 2 should be maintained at about 100 millimeters. Overhead vapor from the fractionating column, consisting of steam and organic vapors, predominantly MEP, are condensed in condenser 11. As many as six condensers may be arranged in parallel at this point. The condensate, mostly water and MEP, flows by gravity from the condenser to the accumulator 12, which functions as a phase separator between the water and the organic. The organic layer from the accumulator, which is mostly MEP, is pumped through line 14 to the top of fractionating column 2 as reflux. The flow regulator 17 maintains a constant rate of reflux to the fractionation column, any excess being withdrawn at 15. The reflux consists essentially of MEP and water, in the ratio of about 14:3 parts by weight. A side stream from the reflux to the fractionator column is passed through sulphur pot 16 to dissolve sulphur and thereby inhibit polymerization. The water phase from the accumulator is withdrawn at 13 and pumped to a surge separator tank (not shown) for further treatment. The recovered MEP is used to prepare additional MVP in the manner previously described. The fractionator bottoms are drawn off at the base of conduit 3; part being recirculated through line 4, the remainder being passed by line 5 to the MVP water removal column. The water vapor and organics removed overhead from the crude dewatered MVP may be returned to the bottom of fractionator column 2 along with the superheated steam.

While the process has been described as applied to the separation of liquid mixtures of MEP and MVP, the process would be operable in any fractional distillation wherein it was necessary or desirable to maintain a liquid level substantially constant and to adjust the amount of heat supplied to the fractionator in response to variations in the liquid level.

Having thus described my invention, it will be understood that it embodies such other variations and modifications as come within the spirit and scope thereof.

I claim:

1. In a process for the fractional distillation of a mixture of organic compounds wherein heat is supplied to the distillation zone by injection of a superheated steam, the improvement comprising maintaining the liquid level substantially constant in the distillation zone by adjusting the temperature of the injected superheated steam in response to variations in said liquid level.

2. The process of claim 1 wherein the temperature of the steam is raised when the liquid level in the distillation zone rises, and lowered when the liquid level in the distillation zone falls.

3. In a process for the fractional distillation of a feedstock containing mixtures of organic compounds wherein a portion of the feedstock is vaporized and withdrawn overhead and the unvaporized liquid residue flows down countercurrently to an upflowing column of superheated steam injected near the base of the distillation zone, the improvement comprising maintaining the liquid level substantially constant in the distillation zone by raising the temperature of the superheated steam when the liquid level in the distillation zone rises and lowering the temperature of the superheated steam when said liquid level falls.

4. In a process for the fractional distillation of a feedstock comprising, in part, organic compounds, the steps comprising injecting the feedstock into a fractional distillation zone, withdrawing a low boiling fraction overhead, injecting superheated steam into the lower portion of the distillation zone, said superheated steam rising countercurrently through the down flowing unvaporized liquid residue, withdrawing said residue as liquid bottoms in the form of a narrow column at the base of said distillation zone, said liquid bottoms containing the major portion of the polymerizable component of the feedstock, maintaining the liquid level in the said column substantially constant by adjusting the temperature of the superheated steam in response to variations in the liquid level, the temperature of the superheated steam being automatically raised as the liquid level rises, and automatically lowered as the liquid level falls.

5. The process of claim 4 wherein a portion of the liquid bottoms in said column is recycled to the distillation zone in admixture with said superheated steam, the rate of recycle being coordinated with the steam temperature so as to raise the temperature of the recycle to the maximum temperature of the system as nearly instantaneously as possible, thus minimizing polymerization of the recycle components.

6. The process of claim 5 wherein the feedstock comprises a mixture of methylethylpyridine and methylvinylpyridine.

7. In a process for the fractional distillation of a feedstock comprising at least one polymerizable organic compound, the steps comprising injecting the feedstock into a fractional distillation zone, withdrawing a low boiling fraction overhead, injecting superheated steam into the lower portion of the distillation zone, said superheated steam rising countercurrently through the down flowing unvaporized liquid residue, withdrawing said residue as liquid bottoms in the form of a narrow column at the base of said distillation zone, said liquid bottoms containing the major portion of the polymerizable component of the feedstock, maintaining the liquid level in said column substantially constant by adjusting the temperature of the superheated steam in response to variations in the liquid level, the temperature of the superheated steam being automatically raised as the liquid level rises, and automatically lowered as the liquid level falls, recycling a portion of the liquid bottoms to the distillation zone in admixture with said superheated steam, withdrawing the remainder of the said liquid bottoms from the system for further refining, the rate of the recycle and withdrawal of the respective portions being so adjusted as to maintain the liquid level in said column substantially constant.

8. The process of claim 7 wherein the distillation zone is maintained at subatmospheric pressure.

9. The process of claim 7 wherein feedstock comprises a mixture of methylethylpyridine and methylvinylpyridine, the major portion of methylethylpyridine being withdrawn overhead and the major portion of methylvinylpyridine being withdrawn as bottoms.

10. In the process of claim 7, condensing the overhead vapors, whereby an organic phase and an aqueous phase results, separating the two phases, and recycling the major portion of the organic phase to the distillation zone as reflux.

11. The process of claim 10 wherein sulphur is added to the reflux in an amount sufficient to inhibit polymerization of the organic component thereof.

12. Apparatus for fractionally distilling a mixture of organic compounds comprising, in combination, a fractionating column, an elongated withdrawal well at the base of the fractionating column and in open communication therewith, said well having a cross sectional area less than that of the fractionating column, a recycle conduit connecting the base of said withdrawal well with the fractionating column for recycle of liquid from said well to said fractionating column, a steam superheater, means for admitting steam to said steam superheater, a vapor conduit connecting said steam superheater with said recycle conduit to admit superheated steam into said recycle conduit, and means for adjusting the temperature of the superheated steam in response to variations in the liquid level within the annular withdrawal well.

13. The apparatus of claim 12 comprising, in addition, a condenser, a liquid phase separator, means for withdrawing a vapor stream overhead from the fractionating column and for passing it in series to said condenser and phase separator, and means for returning one of the phases from said phase separator to the fractionating column as reflux.

14. In a process wherein a feedstock containing a mixture of organic compounds is fractionally distilled to recover as bottoms a fraction which tends to polymerize on standing or at elevated temperature, wherein superheated steam is injected at a constant rate but at variable temperature into the distillation zone at a point slightly above the base thereof to supply heat to the process, and wherein a portion of the bottoms is returned to the distillation zone in admixture with the superheated steam, the improvement comprising coordinating the temperature of the superheated steam with the rate of addition thereto of the recycled bottoms so as to raise the temperature of the latter to the maximum temperature of the system as rapidly as possible, thereby minimizing the polymerization of said bottoms fraction.

15. Process of claim 14 wherein the feedstock contains a mixture of alkyl pyridines and alkylvinylpyridines, the latter tending to polymerize on standing or at elevated temperature.

16. A process for the fractional separation of a mixture of 2-methyl-5-ethylpyridine and 2-methyl-5-vinylpyridine, the latter tending to polymerize on standing or at elevated temperature, comprising injecting said mixture into a fractional distillation column maintained at elevated temperature and subatmospheric pressure, withdrawing the 2-methyl-5-ethylpyridine as overhead and the 2-methyl-5-vinylpyridine as bottoms, removing a portion of the latter from the system and recycling the remainder to the lower portion of the fractionation column in admixture with superheated steam, the temperature of the superheated steam being coordinated with the rate of addition of recycle thereto so as to raise the temperature of the recycled bottoms to the maximum temperature of the system as nearly instantaneously as possible, thereby minimizing the polymerization of the methylvinylpyridine content of the recycle.

17. A process for the fractional separation of a mixture of 2-methyl-5-ethylpyridine and 2-methyl-5-vinylpyridine, the latter tending to polymerize on standing or at elevated temperature, comprising injecting said feedstock into a fractional distillation column maintained at elevated temperature and subatmospheric pressure, withdrawing the 2-methyl-5-ethylpyridine as overhead and the 2-methyl-5-vinylpyridine as bottoms, removing said bottoms in the form of a column having a lesser cross sectional area than that of the fractionation column, recycling a portion of the bottoms to the lower portion of the fractionation zone in admixture with superheated steam admitted at a constant rate, and coordinating the temperature of the superheated steam with the rate of addition of recycle thereto so as to raise the temperature of the recycle to the maximum temperature of the system as nearly instantaneously as possible, thereby minimizing the polymerization of the 2-methyl-5-vinylpyridine content of the recycle, and maintaining the liquid level in the column substantially constant by automatically raising the inlet temperature of the superheated steam when the liquid level rises and automatically lowering the inlet temperature of the superheated steam as the liquid level falls.

References Cited in the file of this patent

UNITED STATES PATENTS

| 2,208,296 | Lange et al. | July 16, 1940 |
| 2,350,447 | Cole et al. | June 6, 1944 |
| 2,411,809 | Rupp et al. | Nov. 26, 1946 |
| 2,556,030 | Coulter et al. | June 5, 1951 |
| 2,607,720 | Elwell et al. | Aug. 19, 1952 |

FOREIGN PATENTS

| 666,499 | Great Britain | Feb. 13, 1952 |

OTHER REFERENCES

Coulter: "Distillation Column Design for Processing Polymerizable Compounds," Chemical Engineering Progress, 45, 227–234 (1949).